United States Patent [19]

Aldridge et al.

[11] Patent Number: 4,635,888

[45] Date of Patent: Jan. 13, 1987

[54] FLEXIBLE BANDING AND INSTRUMENT SUPPORT SYSTEM

[75] Inventors: Gerald T. Aldridge; Jerry L. Peters, both of Shelby County, Tenn.

[73] Assignee: Aluma-Form, Inc., Memphis, Tenn.

[21] Appl. No.: 601,678

[22] Filed: Apr. 18, 1984

[51] Int. Cl.[4] .............................................. A47B 96/06
[52] U.S. Cl. .................................. 248/231; 248/219.4
[58] Field of Search ...................... 248/231, 230, 219.4, 248/218.4, 219.1, 219.3; 40/606–608; 211/107

[56] References Cited

U.S. PATENT DOCUMENTS

| 1,601,612 | 9/1926 | Edwards | 248/231 |
| 1,648,338 | 11/1927 | Gaines | 248/231 |
| 1,677,379 | 7/1928 | Ames | 248/231 |
| 2,383,881 | 8/1945 | Murphy | 248/231 |
| 4,338,041 | 7/1982 | Schmanski | 40/608 |

FOREIGN PATENT DOCUMENTS 1087232 8/1954 France .................. 248/231
1477585 4/1967 France .................. 40/606

Primary Examiner—Reinaldo P. Machado
Assistant Examiner—Alvin Chin-Shue
Attorney, Agent, or Firm—Paul M. Denk

[57] ABSTRACT

A flexible banding and instrument support system for use in securing a support, bracket, and any instrument to a utility pole, or the like, including a flexible band provided substantially surrounding a supporting pole, and capable of conforming to its outer surface, upon tightening, a series of connectors, usually in the form of an angle, J-clamp, U-clamp, or other extrusions cooperate with the band ends for securement by means of a bolt for contracting the band tightly around a pole, and thereby holding the instrument bracket firmly in place, while the bracket is formed of an extrusion that is capable of cooperating with fasteners for securing various instruments, such as electrical instruments, wiring, or the like, upon a utility pole, and thereby obviating the need for any drilled holes through the pole for supporting such instruments.

1 Claim, 40 Drawing Figures

FLEXIBLE BANDING AND INSTRUMENT SUPPORT SYSTEM

BACKGROUND OF THE INVENTION

This invention relates generally to the bracketing of instruments, such as electrical components, to a utility pole or the like, but more specifically, pertains to a novel flexible banding means that can secure brackets and its connected instruments directly to a supporting pole without necessitating the need for drilling any apertures or inserting any fasteners through the structure of the pole itself while stably supporting an electrical instrument or related type equipment high upon that erected pole.

There are a variety of pole banding means that have long been available in the prior art, most of them incorporating some type of a bracket that is held by a band that secures to a pole, and such is disclosed in the U.S. patent to Blaw, U.S. Pat. No. 1,653,083, wherein is shown the concept of holding objects, such as a flag, to a pole through the use of a band. But, the particular style of band and its means for connection together for its securement to a light pole is quite distinct from the structure of applicant's invention herein.

The U.S. patent to Murphy, U.S. Pat. No. 2,383,881, discloses a sign supporting mechanism, and a holder therefor, wherein one or more straps secure a sign in place. In this particular instance, it is significant to note in the particular shown holder that the straps are folded back about themselves, at the location of a turn buckle clamp, and that a binding of the outer strap upon the inner strap ends is what apparently holds the straps securely in place upon its shown pole.

The patent to Petersen, U.S. Pat. No. 2,703,216, shows the use of cables for attaching between connecting means for securement of a pole band about a pole, as shown. It is to be noted that an adjustment or tightening means is also disclosed at the ends of at least a pair of the contiguous cable ends and which are subject to interconnecting by a bolt for taking up any slack during tightening of the cables about the shown pole.

The U.S. patent to Banck, U.S. Pat. No. 2,780,205, discloses another form of bracketing device for securement about tubes.

The patent to Richter, U.S. Pat. No. 3,241,800, shows another form of mounting device, in this particular instance for holding various outdoor decorations in place, and it is to be noted that a strap has its ends bound tightly between said strap and the pole for binding purposes. It is also to be noted that the mounting device of this particular patent utilizes a pair L-brackets, rather than just one, associated with their own separate screws for tightening and adjustment purposes for holding the main bracket to the supporting pole.

The U.S. patent to J. L. Salmon, et al, U.S. Pat. No. 3,374,978, and which is owned by a common assignee of the invention of this current application, discloses a pair of adjusting brackets for securing, in this particular instance, electrical devices to a utility pole.

The U.S. patent to Cheslock, U.S. Pat. No. 3,462,110, discloses a support assembly, but it is just not constructed in any way similar to the structured concept of this current invention which is devised particularly for securement to a telephone or utility pole for holding bracketing devices for supporting other electrical or equivalent instruments high upon the erected pole, without necessitating the use of any screws, or the like.

The U.S. patent to Kautz, U.S. Pat. No. 3,734,438, also discloses a transformer mounting apparatus, wherein its link assemblies cooperate with the adjustment bolt-nut combinations for tightening the installation in place upon a utility pole.

The patent to Johnson, U.S. Pat. No. 3,750,992, shows another form of a transformer mounting assembly, having a series of adjustment bolts holding the shown apparatuses in place.

U.S. patent to Heard, U.S. Pat. No. 3,894,707, discloses another form of mounting device, incorporating a band, but the particular band, in addition to its other supported elements, are held together by various components that are quite distinct from what is shown being devised as invention and as described in this current application. But, what is similar with respect to this Heard patent is the fact that it is utilizing a channel member that is secured by a band means for attachment of that channel and its supported sign to a circular post.

In another U.S. patent to Heard, U.S. Pat. No. 4,066,233, there is shown a related type of strap held mounting device for securement of another component to a utility pole, and which incorporates a saddled shaped seat for centering of the device to the pole.

In yet another Heard patent, U.S. Pat. No. 4,125,240, there is shown a further variation upon the earlier inventions of this particular patentee.

And in still another Heard U.S. Pat. No. 4,211,381, there is disclosed another variation upon a mounting device, and what is pertinent about this particular device, as with all of the Heard patented inventions, is that most of them do incorporate some form of a channel-shaped member for use in an installation means for holding other components thereto. But, what is different about these Heard channel-shaped members, and the invention of this current application, is that in Heard, channel openings are all directed toward the utility pole, primarily for either seating or band grasping purposes, whereas, the channel openings for the instrument bracket of this current invention are all directed outwardly, for cooperating with a series of fastening means, such as bolts, and which may be used for mounting and securing of other instrumentalities to the bracket, and hence upon the erected pole.

Finally, the patent to Seebinger, U.S. Pat. No. 4,325,529, shows another form of band held bracket assembly for securement upon a utility pole, and which would appear to be able to avoid the necessity for drilling any holes into the post, for securement of other apparatuses thereto.

In view of the foregoing, it is the principal object of this current invention, to provide various structured brackets that may be tightened securely upon a utility or other pole, any load bearing device whether it be disposed in any angle, without necessitating any drilling within the same, but yet which brackets are shaped and formed for cooperating with fasteners, adjustably, for stably holding various electrical instruments or other components high upon the utility pole.

Another object of this invention is to provide an extruded or other bracket for a instrument support and which incorporates a channel-like slotted opening for cooperating with the heads of fasteners for mounting of various instruments to the erected pole.

Still another object of this invention is to provide other forms of shaped brackets, primarily made as extrusions, and thereby can be made to varying widths, as desired, for cooperating with fasteners and for holding various instruments high upon a utility or other pole.

Still another object of this invention is to provide various shaped channel-like brackets that may be used either individually, or in combination, for securement by means of flexible banding means to a utility pole and for holding a variety of electrical instruments, or other components, to a utility pole.

Still another object of this invention is to provide various types of contracting connectors that cooperate with the ends of a flexible band for tightly securing the said band around a utility or other pole and being useful for holding the various type of instrumentalities as previously described.

Yet another object of this invention is to provide various types of connectors, being generally extruded in configuration, and which may contain a series of slots for cooperating with fastening bolts, and a flexible band for securement of various instruments to a utility pole, without necessitating the need for any drilling into the pole or other fasteners for a direct connection of the instrument bracket thereto.

Still another object of this invention is to provide an instrument supporting system formed from a bracket and a flexible banding means that may be readily and promptly installed high upon a utility pole, and done so rather quickly due to the unique construction of the various components that make up this mounting system.

These and other objects may become mor apparent to those skilled in the art upon reviewing the summary of this invention, and upon undertaking a study of the description of its preferred embodiment, in view of the drawings.

SUMMARY OF THE INVENTION

This invention contemplates the formation of various shaped extruded brackets for use in conjunction with a flexible banding means, and which may stably be bound tightly to a utility pole, or to any other structure that requires a bracket, such as in the cable TV field, or upon any other type of support, and useful for supporting various types of electrical equipment or other of a variety of components such as electrical wire, grounding wire, cable, or the like, high upon said utility pole, or other support. Examples of other supports may include beams, structural columns, pipelines, pilings, trees, and any infinite number of structures. The essence of the invention is to provide for these brackets to be made to various widths and sizes, mainly due to their extruded configurations, and which extrusions are shaped into a particular form where they generally will cooperate with, as for example, the head of a bolt or other fastening means for holding tightly the electrical instruments directly to the bracket, and thus firmly to the supporting pole.

The various brackets designed for this invention, and which are of an extruded nature, include a channel like member that has integrally formed a base portion or member, being ribbed, in order to assure the emplacement of the bracket upon the pole when tightened by means of the flexible band. The base portion includes a pair of upstanding walls, with inturned edges, thereby forming a slot or clearance channel centrally thereof, and in which may be accommodated the head of a bolt, or other fastening means, and which may be adjustably slid there along, to provide for securement of various electrical or other instruments to the bracket and thus upon the utility pole.

Other forms of brackets are contemplated by this invention, including a pair of the above defined channel-like members may be linked together by means of an intermediate structure or plate, and for holding either a variety of electrical components upon the utility pole, or perhaps for providing double support for any instrument to the brackets of this system.

Other variations upon the bracket of this invention include a base portion having an integral upstanding part, with the base portion being disposed for securement by means of the band to the utility pole, while the upstanding portion may cooperate with fasteners for securement of electrical components to the utility pole. As explained, all of these components may be formed as extrusions, and therefore their length dimensions may vary depending upon the size of the pole to which these brackets may be secured, or the number or type of instrumentalities to be mounted upon the same. Other forms of brackets include a pair of base portions, as previously explained, and having angulated or other surfaces arranged therebetween, integrally formed therewith, for securement of a variety or electrical components of particular configuration to the utility pole.

The connectors are useful for holding the ends of the flexible band to the utility pole and likewise be formed as extrusions, and may include various lengths of stock material having one or more slots formed therethrough, so that the ends of the bands may be inserted therein, through the same, and then turned back so that as the connectors are tightened by means of a bolt or other fastener for securing the band ends together, these turned ends for the bands will be tightly bound intermediate the connectors and the contiguous utility pole for assuring band support upon the utility pole. Other connectors include various forms of angles, J-clamps, or U-shaped connectors that include select slots, for insertion of the band ends therethrough, and also include various aligned apertures and through which a bolt or other fastener may be secured, between a pair of connectors, and which when tightened contracts the two connectors together, thus securely binding the flexible band to the utility pole, in addition to its held bracket, and any electrical component that may be mounted thereon.

BRIEF DESCRIPTION OF THE DRAWINGS

In the drawings,

FIG. 24 discloses a modification to the instrument supporting bracket of this invention, this one being useful for mounting of a transformer, or the like;

FIG. 26 is a side view thereof;

DESCRIPTION OF THE PREFERRED EMBODIMENT

Figure 1:
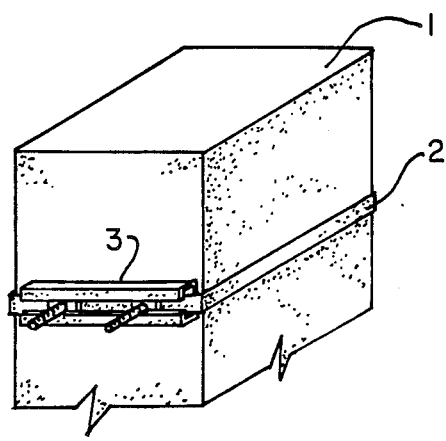
FIG. 1 provides an isometric view of a utility or other pole having one of the flexible banding and instrument support systems including the bracket for this invention mounted thereto.
Figure 2:
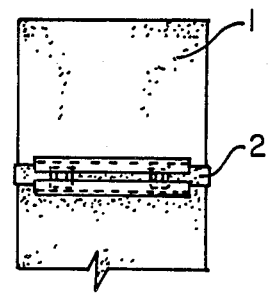
FIG. 2 provides a front view of the banded bracket shown in FIG. 1.
Figure 3:
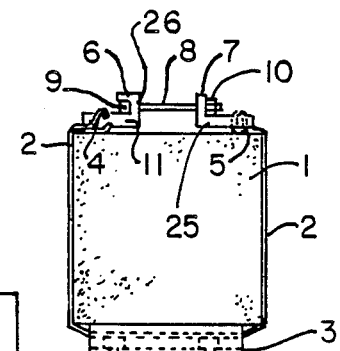
FIG. 3 provides a plan view of the banded bracket shown in FIG. 2.

In referring to the drawings, and in particular FIGS. 1 through 3, there is shown a pole, such as a utility pole 1, or which may be any other style of pole or support for supporting various instruments, wires, or other objects, and in this particular instance, is disclosed comprising one having a rectangular or square shape, in cross section, so that the advantages and benefits to be derived from utilizing a flexible band, such as embodied in this invention, may be more fully understood. As shown, the band 2 embraces the pole rather contiguously, conforms with its shaped configuration, and the band is useful for mounting a bracket 3 to the front or other side of the pole, and which bracket may have a width approximating the width of the front surface of the pole itself. As can also be seen in FIGS. 2 through 4, the pole 1 has the band 2 tightly conforming to its outer contours, and the said band 2 is continuous throughout its length, extending through the bracket 3, as shown, so as to tightly bind the bracket against the surface of the pole, and securely stabilize it in place, in addition to any instruments that may be mounted to the said bracket. The back or free ends, as at said 4 and 5, of the band 2 extend through a pair of connectors 6 and 7, and which connectors are provided with slots for accommodating the insertion of the band ends therethrough, with the band ends as at 4 and 5, then being turned back for lying contiguously underneath of each of their respective connectors, and arranged intermediate the back of said connector and the back pole surface, so that when the connectors are firmly tightened in place, the band ends become securely fixed, and unable to obtain freedom, or eased from their binding, surrounding the utility pole. To facilitate the hold of the band to its associated bracket, the band may be crimped at its bend location, although this is not an absolute requirement. Each of the connectors 6 and 7 have aligned apertures therethrough, as will be subsequently shown, and through these apertures is arranged a single fastening means, such as the bolt 8, and which bolt includes a head 9 at one end, and a nut or other fastener 10 at the other end, such that when the nut is tightened upon the bolt, the connectors are contracted or drawn together, thereby tightly adhering the band to the pole, and likewise firmly securing the bracket 3 across its frontal surface, for mounting and securing of other instruments.

Figure 4:
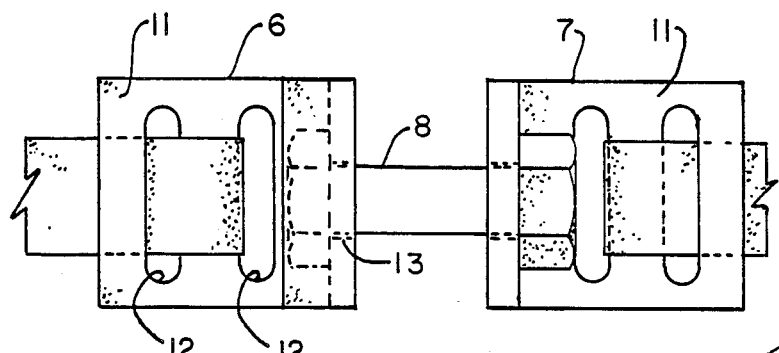
FIG. 4 provides a back view of just the flexible banding and fastening connectors for the instrument support system of this invention, as shown in FIG. 3.

In referring to FIG. 4, the shaped connectors, such as one of the connectors 6 or 7, are formed as an extruded member, having the length shown, and includes a base portion 11 that tightly binds against the contiguous band end, with the connector having the slots, as at 12, formed therethrough, and through which the band end inserts initially just prior to the tightening of the various connectors together in the manner as previously described. In addition, the interior of the connector 6 or 7, also includes the aperture, as at 13, and through which the fastening means or bolt 8 may locate, in order that the pair of connectors 6 and 7 may be drawn together, in the manner as previously analyzed.

Figure 5:
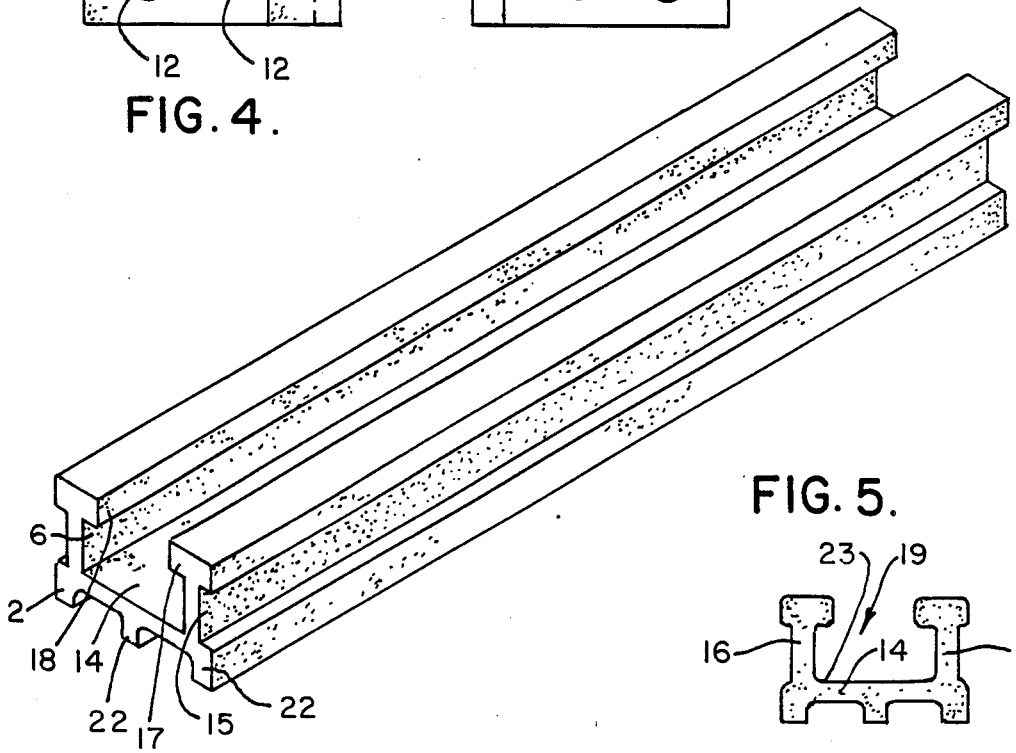
FIG. 5 provides a perspective view of one of the extruded brackets of this invention.
Figure 6:
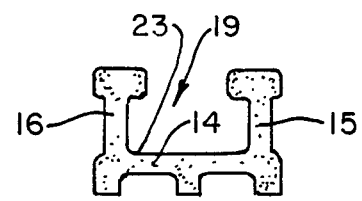
FIG. 6 provides a side edge view thereof.
Figure 7:
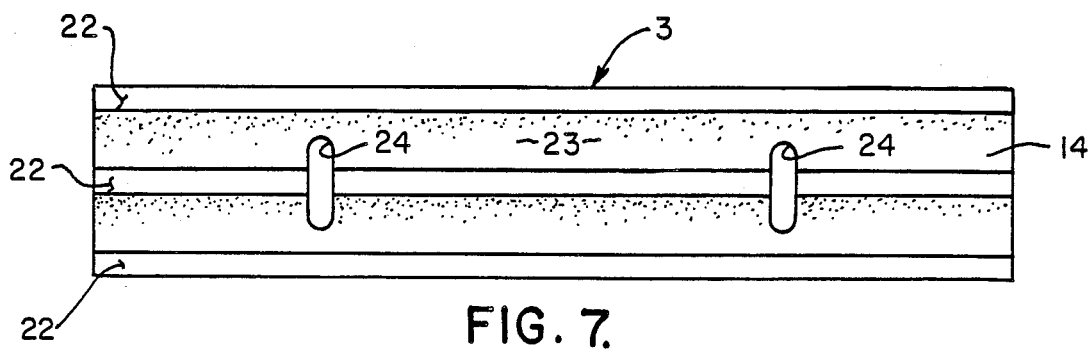
FIG. 7 provides a back view thereof.

In referring to FIG. 5, one form of the bracket 3 is clearly shown, and as can also be seen in FIG. 6, this particular bracket likewise may be formed of an extruded material, such as aluminum, or other metal, and is shaped having a base member 14 and from which a pair of extending walls 15 and 16 project forwardly, with each of the walls including an inturned edge, as at 17 and 18, respectively, so as to provide a channel slot or clearance, as at 19, therethrough, and into which the head of a bolt, or other fastening means, may be conveniently accommodated, in a close tolerance fit, but yet firmly retained therein by means of the said walls and inturned edges, so that the shank of any such fastening means, such as the bolts 20 and 21, shown in FIG. 3, may project forwardly, and be readily available for mounting of any electrical instrument, or other component, directly to the bracket now so firmly secured upon the utility or other pole. As can further be seen in FIG. 7, the rearward portion of the bracket 3, includes a series of rearwardly directed ribs, as at 22, and these ribs are useful for tightly binding against the surface of the pole, and assure its firm stationary retention thereat, once the banding means has become secured therearound. It should be noted with respect to FIG. 6 that the channel slot or clearance area 19 is of sufficient dimension so as to allow for the insertion of the band through said channel, and to provide for its resting tightly upon the interior surface 23 of the bracket, for the purpose of tightly securing the same in place. Or, slots, as at 24, may be provided through the base 14 to allow the insertion of the band means 2 therethrough for holding the bracket 3 to the pole.

It is also likely, although it is not shown, that the bracket 3 may be of substantial width, extend some distance, or even far beyond, the side edges of the pole 1, and in that instance, various slots, such as the slots 24, may be provided through the base member 14 of the bracket, being spaced apart a dimension substantially equivalent to the width of the pole, so that the band and its ends may be inserted therethrough before they are bound by means of the various connectors to the back side of the utility pole.

Various forms of connectors, as stated, are provided for mounting of the bracket to the utility pole. As for example, in FIG. 3, it can be seen that the connectors are formed as an angle member 25 and a J-clamp 26, with the J-clamp having sufficient clearance to provide for the snug fitting of the head 9 of the bolt 8 therein, and to prevent its turning while the nut 10 of the bolt is fastened for contracting the two connectors 25 and 26 together. It is to be noted that the base portions 11 of each of these connectors is provided with a pair of slots therethrough, as noted, with these slots being identified as 12. Thus, the free ends of the band 2 may be inserted through each of these pair of slots, in the manner as shown, so that the ends 4 and 5 of said band may be disposed intermediate the base portion and the overlying band 2, and the back surface of the pole, so that when the connectors are contracted by means of tightening of the bolt 29, these band ends become securely fixed in place, in their turned back relationship, and secure the bracket 3 firmly to the front surface of the utility pole.

Figure 8:
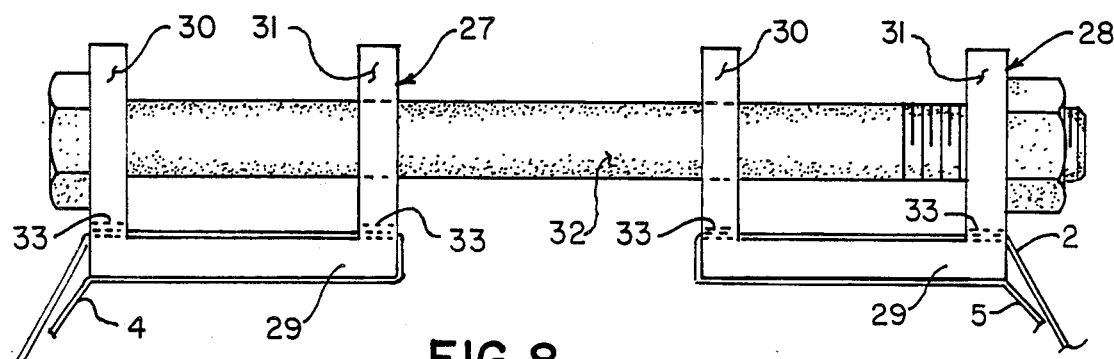
FIG. 8 provides a plan view of a modification to the connectors useful for tightening the flexible band of this invention to the utility or other pole.
Figure 9:
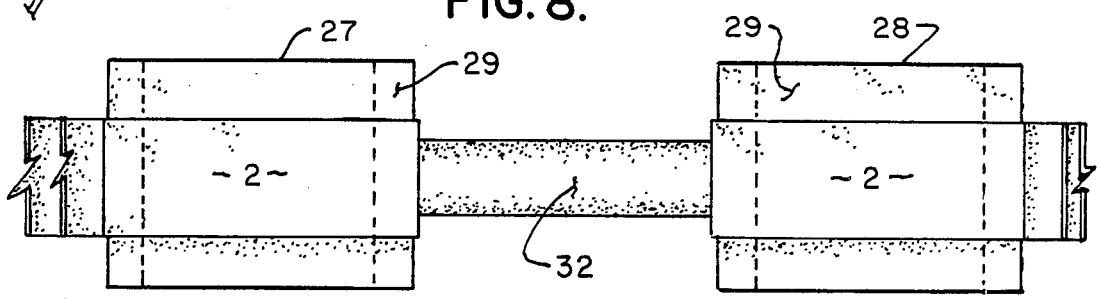
FIG. 9 provides a back view of the invention shown in FIG. 8.
Figure 10:
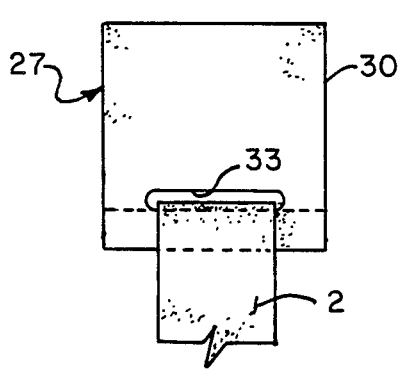
FIG. 10 provides a side view of one of the connectors as shown in FIG. 9.

As can be seen in FIGS. 8 through 10, another style of connector is disclosed. In this particular instance, each of the connectors 27 and 28 are formed as a U-shaped length of material, each incorporating a base portion 29, and having upstanding side walls 30 and 31, incorporating aligned apertures therethrough, so that the bolt means 32 can be inserted therein, and firmly tightened in place so as to contract and draw these two connectors together, and to securely fasten the band and any supported bracket to the utility pole. To achieve such, once again, the band 2 has its free ends 4 and 5 inserting through aligned slots, as at 33, of each of the connectors 27 and 28, so that when the connectors are tightened in place, the band ends become fixed intermediate each of their respective connectors and the pole surface, tightly binding the band and its bracket to the utility pole.

Figure 11:
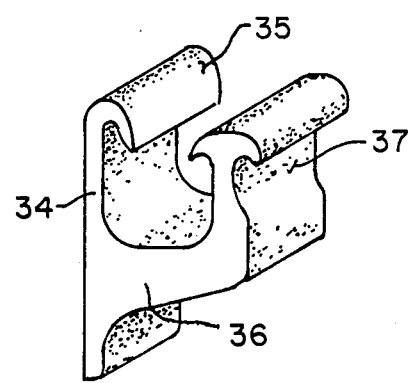
FIG. 11 provides a perspective view of a modification to an instrument or other means supporting bracket of this invention.

Another variation upon an extruded type of bracket for mounting an instrument or other member, such as a wire, or guy, is shown in FIG. 11. In this particular instance, the bracket includes a base member 34 having a turned upper edge 35 and through which the band may freely locate, for binding of the bracket to the pole in the manner and through the usage of the variety of connectors as previously described. The bracket includes a forwardly extending portion 36, and incorporates a projection portion that extends upwardly, as at 37, and which is useful for cooperating with fasteners, or other securing means, for holding of electrical or other components, such as a wire or cable, to the said brcket, and resultingly to the utility pole.

Figure 12:
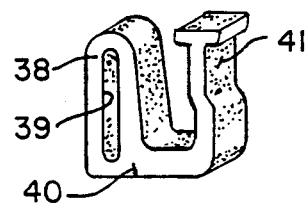
FIG. 12 provides a perspective view of a modification to the instrument or other means supporting bracket of this invention.

Another form of extruded bracket is shown in FIG. 12, wherein its base member 38 includes a slot 39 provided therethrough, and furnishes sufficient clearance for insertion of the band, for the purpose of fixing of the bracket to the utility pole. The base member includes a forwardly extending portion 40 and which incorporates integrally and upwardly extending portion 41, which, once again, may cooperate with a variety of fasteners for securement of a componenet to the bracket, and hence to the utility pole. The upper end of the portion 41 may be flared for facilitating its retention purposes.

Figure 13:
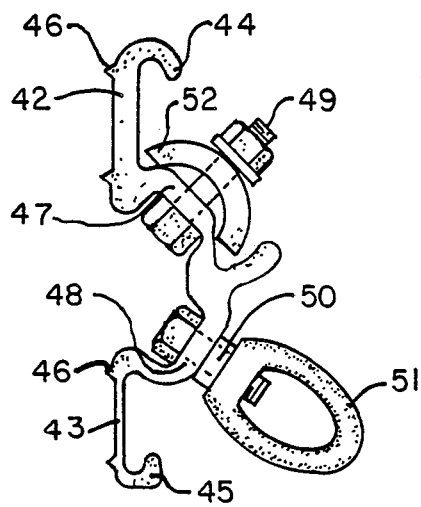
FIG. 13 provides a side view of a modification to the instrument or other means supporting bracket of this invention.
Figure 14:
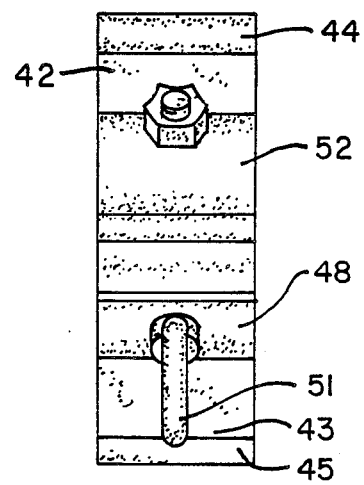
FIG. 14 provides a front view of the bracket disclosed in FIG. 13.
Figure 15:
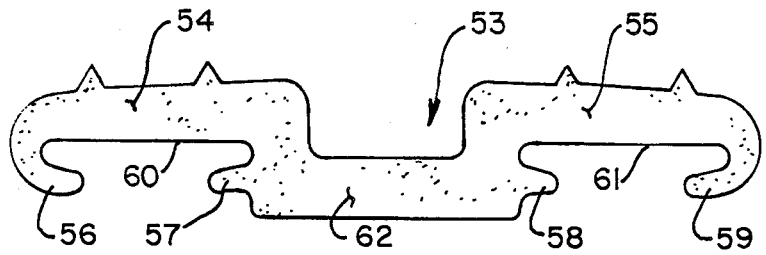
FIG. 15 provides a side view of a modification to the instrument or other means supporting bracket of this invention.
Figure 16:
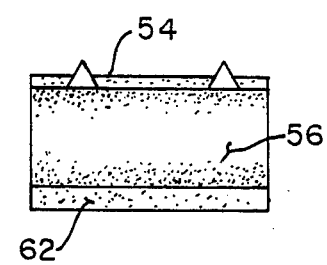
FIG. 16 is an end view thereof of the bracket shown in FIG. 15.
Figure 17:
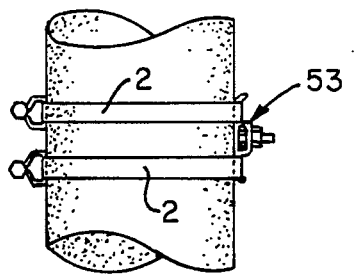
FIG. 17 shows the bracket of FIG. 15 secured to a pole by means of a pair of band means.
Figure 18:
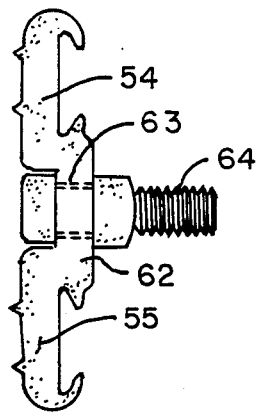
FIG. 18 shows the bracket of FIG. 15 having a bolt means secured thereto.
Figure 19:
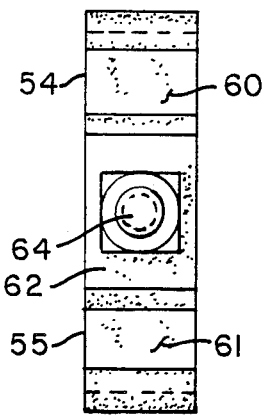
FIG. 19 is a front view of the invention disclosed in FIG. 18.

Another variation upon a style of bracket that may be used in conjunction with the banding means and system of this invention is shown in FIGS. 13 and 14. In this particular instance, a pair of base portions 42 and 43 are provided spaced apart, in the manner as shown, each having a turned end 44 and 45, respectively, and providing sufficient clearance for insertion of bands therearound for a double securement of the said bracket to the utility pole. The back surface of the base member may include projections, as at 46, and which may be of spiked shape, as shown, so as to allow for the frictional engagement of the said bracket to the frontal surface of the pole, when fastened in place. The bracket incorporates integrally a series of angled surfaces, as at 47 and 48, and which may incorporate fastening means, as at 49 and 50, respectively, and which may cooperate for holding various other components to the utility pole. Such components may include a wire guide, as at 51, or a clamping means as at 52.

A variation upon the previously analyzed bracket, wherein a double securement is provided, is also shown in FIGS. 15 through 19. In this particular instance, the bracket 53 includes a pair of base members 54 and 55, being arranged, at upper and lower dispositions, with each base member having extending edges 56 through 59, respectively, and providing sufficient clearance for disposition of a band means therein, in the manner as previously explained with respect to the band means 2 as analyzed in FIGS. 5 and 6. Thus, there is sufficient clearance against the interior surfaces 60 and 61 of each of the base members to allow the locating of the banding means therethrough, in order to provide for a double securement of this particular bracket 53 to the frontal surface of the utility pole. In order to stabilize and integrate the upper and lower bracket portions of this invention together, a plate or third base member 62 is integrally arranged intermediate the upper and lower parts of this bracket, and this particular plate may also include various apertures, as at 63, theretghrough so that various fasteners as the bolt 64, may be accommodated for the attachment of other components to the bracket after or during its installation high upon the utility or other pole.

Another variation on a style of connector is shown in FIGS. 20 through 23. But, even though this particular device is being described as a connector, it can equally be employed as a bracket for holding, as for example, a cable, down wire, grounding wire, or the like, supportingly to a utility or other pole. The bracket or connector includes a base member 65 which has formed integrally forwardly thereof a series of angulated walls, as at 66 and 67, and which at their forwardmost ends converge into integral closure, as can be seen at 68. There are a pair of communicating slots, as at 69 and 70 formed within the base member and angulated walls, with one of the slots, namely, the slot 69, being provided for receiving the band means therethrough, when this device functions as a bracket, or a band end, when it is performing as a connector, and which band will be supported therethrough and designed to hold other components to the bracket, when it functions in that fashion. One edge of the connector, as at 65a may be beveled to cooperate with any crimped band to hold it in position after attachment. When the device is operating as a connector, then there will be two of such devices operatively associated with each of the two band ends, so that when the two connectors are aligned, at the band ends, proximate the back edge of the pole, a bolt may then insert through the second slot or opening 70, for each of the connectors, and when tightened in place, drawing the two said connectors in the direction towards each other, and thereby tightening the band firmly about the utility pole.

Figure 22:
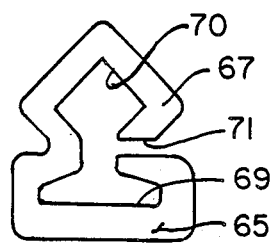
FIG. 22 is a side view of a slot added modification to the instrument supporting bracket or connector shown in FIG. 20.
Figure 23:
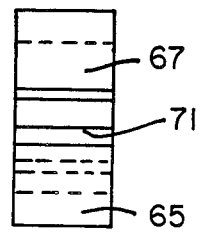
FIG. 23 is a lower edge view of the bracket shown in FIG. 22.
Figure 24:
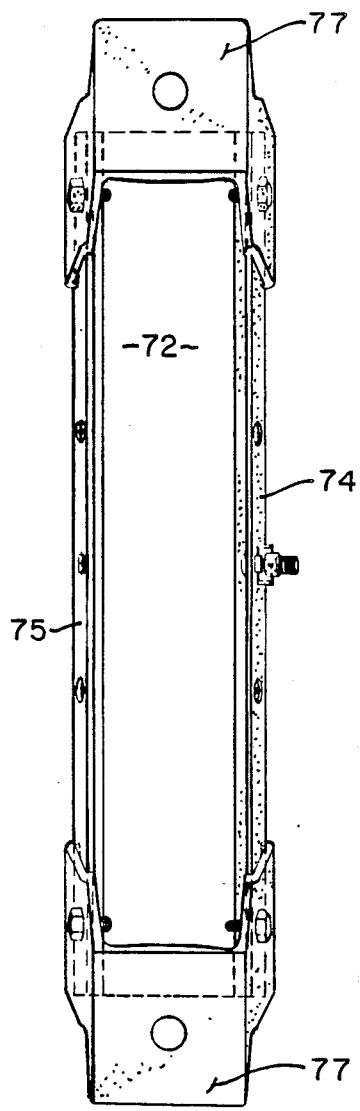
Figure 25:
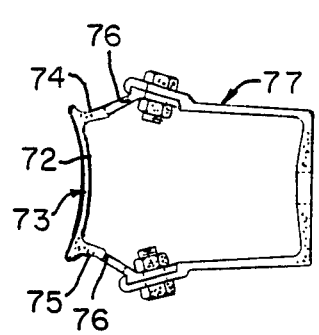
FIG. 25 is a top view thereof.

As previously referred to, FIGS. 22 and 23 show another slight variation upon the bracket or connector, as just defined, but in this particular instance, the two pair of communicating slots 69 and 70 also open to the exterior by means of the spacing 71 formed through the angulated side wall 67. Thus, when this particular device functions as a bracket, held by a band inserting through the slot 69, any form of guy wire, cable, or the like, that is to be held and supported by this particular bracket, may be freely inserted through the spacing 71, once the bracket is firmly affixed in place by means of the band means to the utility pole.

Another variation upon the style of bracket securing with the utility pole is that which is shown in FIGS. 24 through 27. As disclosed, the bracket includes a base member 72, being shaped to conform to the shape of the supporting pole P, as at 73, and in this particular instance having an arcuate shape for flush mounting against a round utility pole, as commonly used in the trade. A pair of walls 74 and 75 integrally extend from the edges of the said base member, and each wall incorporates a slot, as at 76, therethrough, and through which the band means, as previously explained at 2, may insert therethrough for firmly affixing this bracket snugly against a utility pole. As can be seen, a support like member, as at 77, may be affixed by means of the shown fasteners to the outer edges of the pair of walls 74 and 75, and each of these supports may be disposed for holding a transformer or the like, as shown at T, in FIG. 27, firmly upon a utility pole. This type of support means for mounting of electrical instruments to a utility pole has already been shown and explained, generally, in the prior U.S. Pat. No. 4,296,904, that is owned by a common assignee of this current invention and application.

Figure 20:
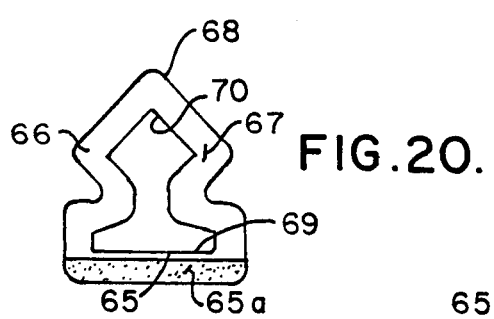
FIG. 20 provides a side view of a modification to the instrument supporting bracket of this invention; and which may also function as a connector.
Figure 21:
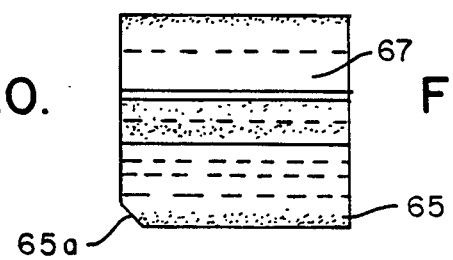
FIG. 21 is a lower edge view of the bracket shown in FIG. 20.
Figure 27:
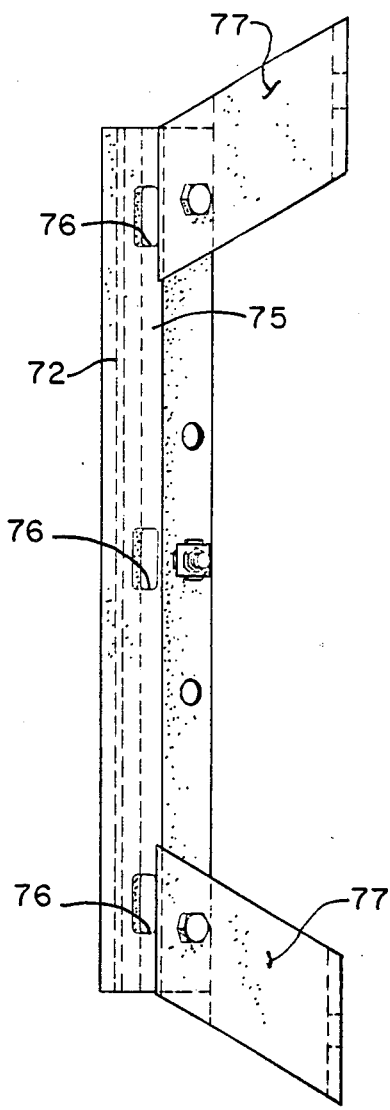
FIG. 27, in the lower part, is a side view of the bracket shown in FIG. 24, being mounted by means of three banding means to the utility pole, and also disclosing in phantom line a transformer, or the like, being mounted to the said bracket.

It might further be commented that the style of connector securing the band ends together, at the back end of the utility pole, as shown in FIG. 27, is that style of connector as previously explained in FIGS. 20 and 21. And, a bolt 32 inserts through the pair of connectors, only one being herein shown, in order to fasten the band ends tightly against the back of the pole.

Figure 27A:
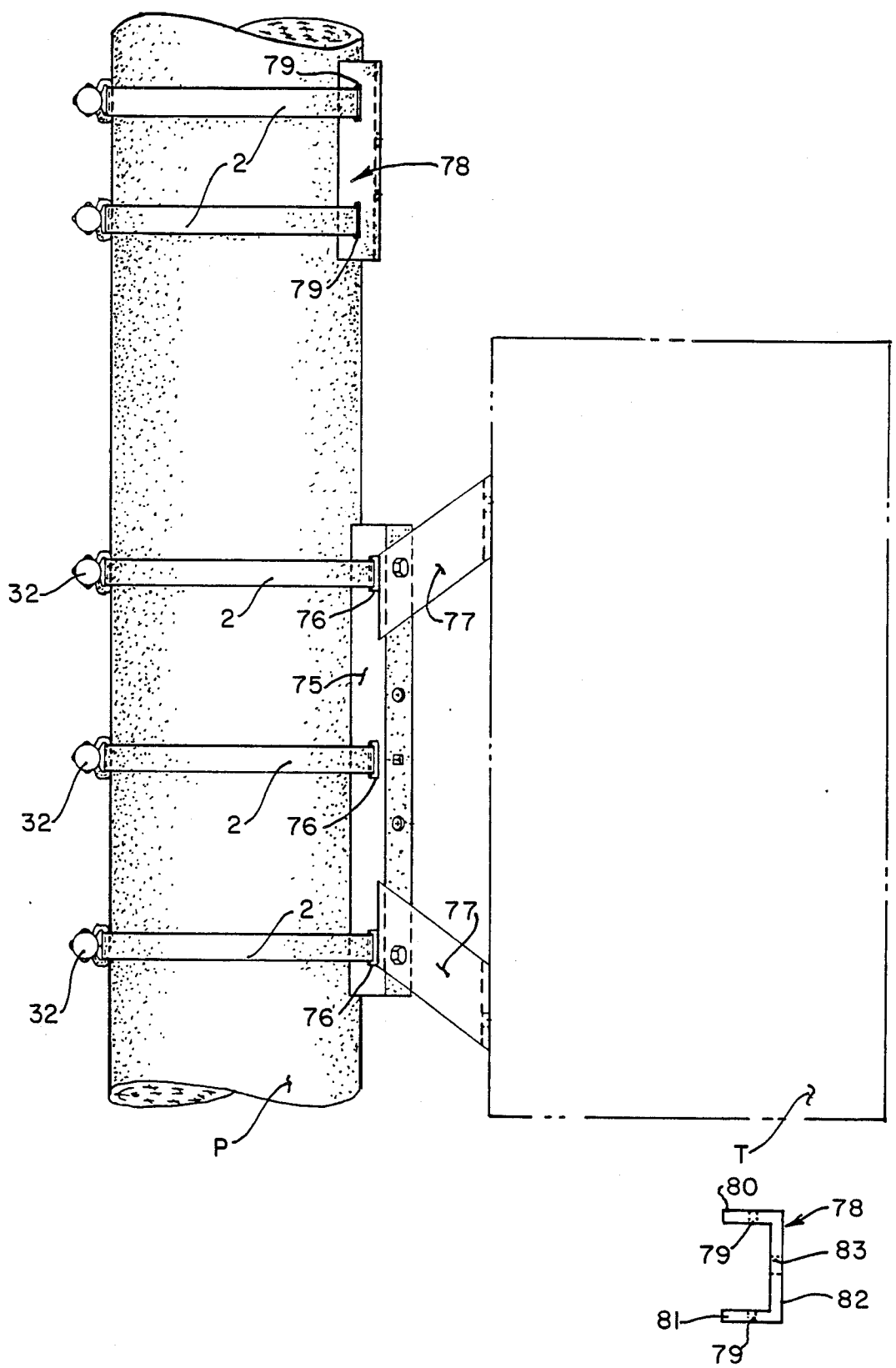
FIG. 27a is a top view of the modified bracket shown in the upper part of FIG. 27.

It can be also noted that at the upper end of the utility pole as shown in FIG. 27, and as also noted in FIG. 27A, is a three-sided bracket 78 mounted upon the utility pole, held in place by means of the band means 2, and which inserts through slots, as at 79, formed through each of the side walls 80 and 81, and which in turn are integrally formed with the front wall 82 of the shown bracket. Various fastening means, such as the use of a bolt or the like (not shown) may insert through an aperture, as at 83, provided through the front of the bracket 78 in order to hold other components to the bracket, and hence to the utility pole.

Figure 28:
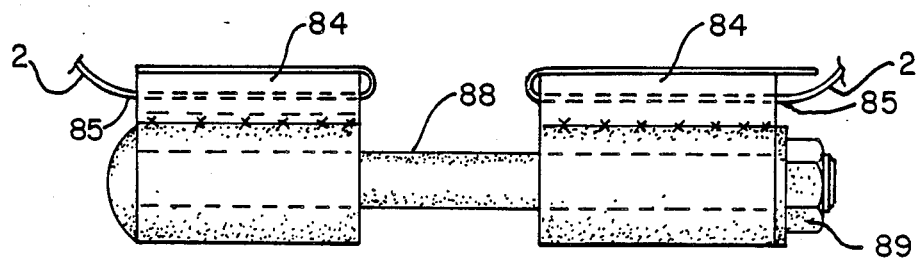
FIG. 28 provides a top view of a modification to the fastening connectors for the instrument support system of this invention.
Figure 29:
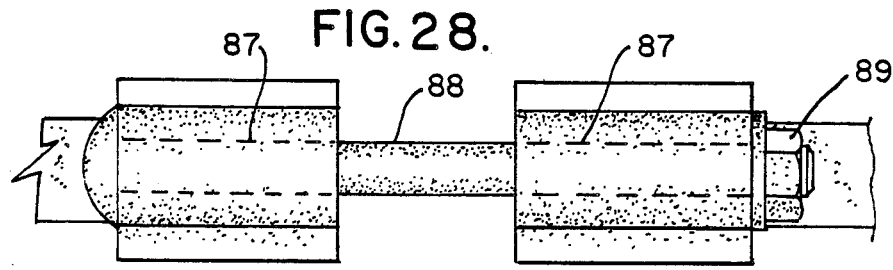
FIG. 29 is a front view thereof.
Figure 30:
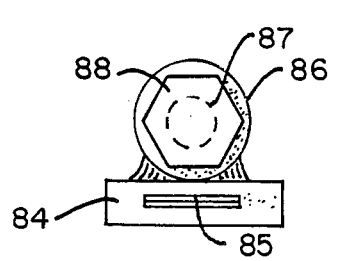
FIG. 30 is a side view thereof.

Another style of modification to the connector means of this invention is shown in FIGS. 28 through 30. In this particular instance, while the structure of the connector to be hereinafter defined may be different in appearance from that which was explained with regard to the connector of FIG. 20, the function of the connector will be very similar. As can be seen, each connector includes a base member 84, having a slot, as at 85, provided therethrough, and through which the band means 2, or more specifically its ends, may insert for fixing the band means about the utility pole. The base member includes an integrally formed boss means 86 extending forwardly thereof, and which incorporates an aperture, as at 87, and through which a bolt or other fastener 88 inserts, through the said aligned apertures provided through each of the adjacent connectors, so that when the fastener is tightened in place, as through a tightening of its nut 89, the connectors will be drawn together, and the band firmly and tightly secured about the utility pole. As previsouly explained, though, it is likely that one or more of these connectors may even be fastened by means of the band means to the front of the utility pole, or elsewhere around its perimeter, and therein function as a bracket for holding other means, such as wires, to the pole, as previously explained. Thus, there is the capability of a dual function for these connectors when embodied within the support system of this invention.

Figure 31:
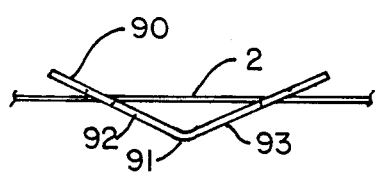
FIG. 31 is a top view of a modification to an instrument supporting bracket of this invention.
Figure 32:
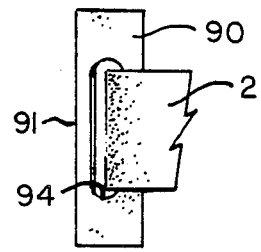
FIG. 32 is a side view thereof.
Figure 33:
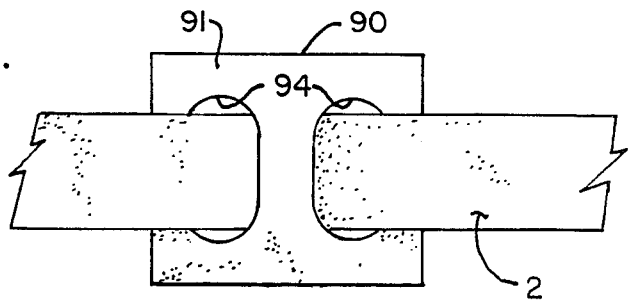
FIG. 33 is a front view thereof.

Another form of bracket for application within this invention is shown in FIGS. 31 through 33. In this particular instance, the bracket is formed as a base means 90 which is bent, as at 91, at approximately its midpoint, forming two generally flattened sections, as at 92 and 93, and there being apertures provided through each of these sections, as at 94, and through which the band means 2 inserts, and is extended therethrough, for securement of the bracket to the utility pole. This particular style of bracket has utility for support of grounding wires, or for the holding of other cables proximate the pole to which it is applied.

Figure 35:
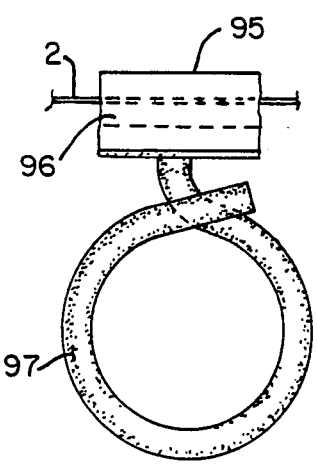
FIG. 35 is a top view thereof.
Figure 34:
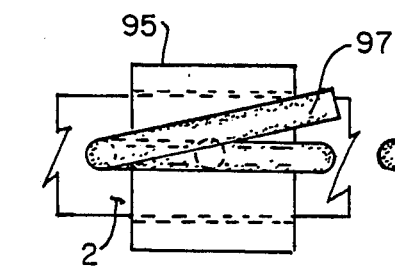
FIG. 34 is a front view of a modification to an instrument supporting bracket of this invention.
Figure 36:
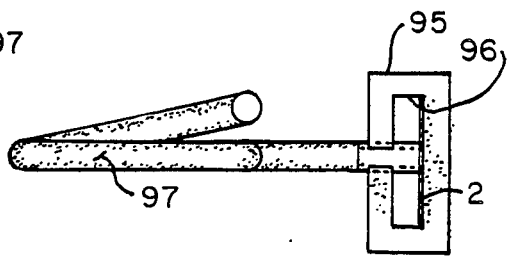
FIG. 36 is a side view thereof.

Still another design for a bracket for use in conjunction with this invention is shown in FIGS. 34 through 36. As disclosed, the bracket incorporates a base member 95, having a slot as at 96, formed therethrough, and through which the band means 2 may insert, for holding of the said bracket to the utility pole in a manner as previously explained. Connecting to the frontal part of the base member is a shaped wire, which may be defined as a pigtail type configuration, as at 97, and through which various wires, cables, or the like, may insert and be held for fixing with the utility pole.

Figure 37:
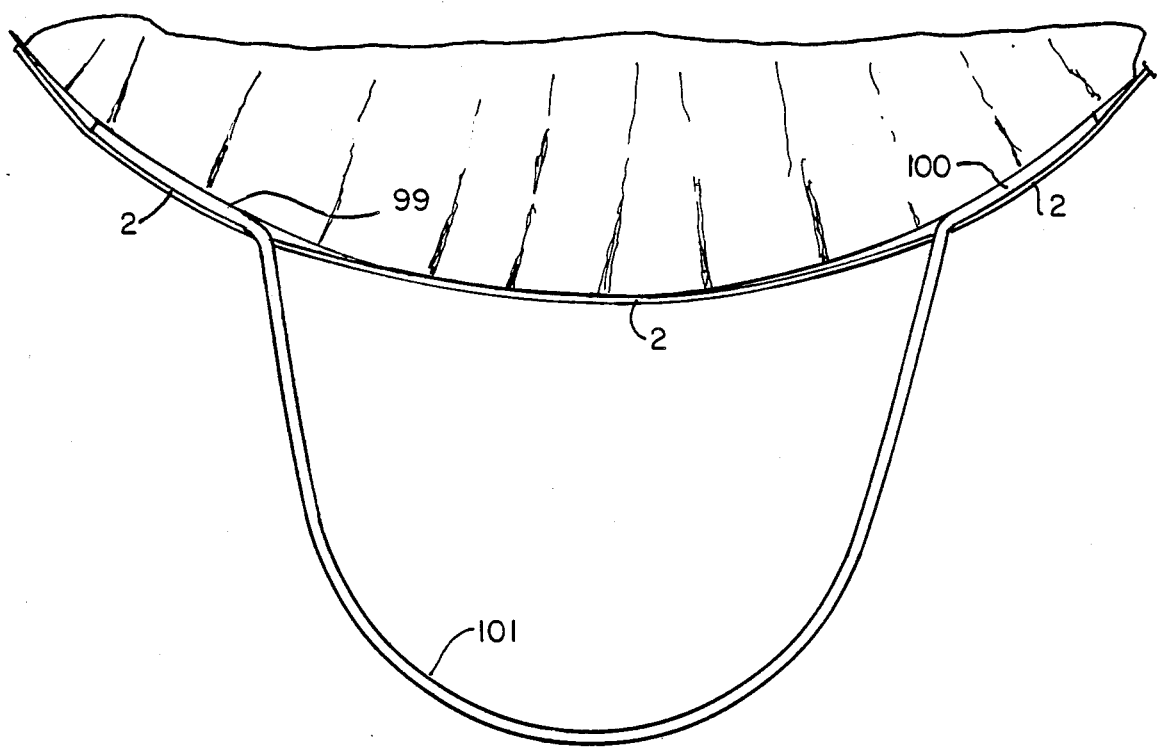
FIG. 37 is a top view of a modification to an instrument supporting bracket of this invention.
Figure 38:
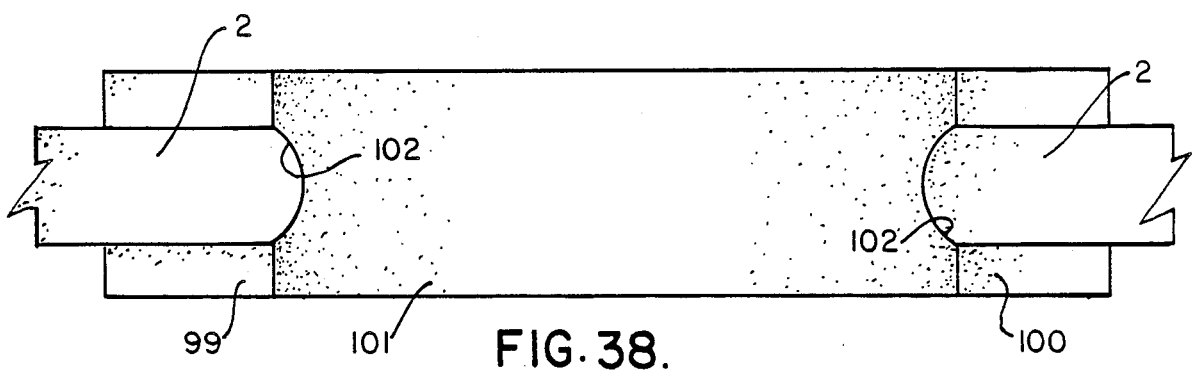
FIG. 38 is a front view thereof.
Figure 39:
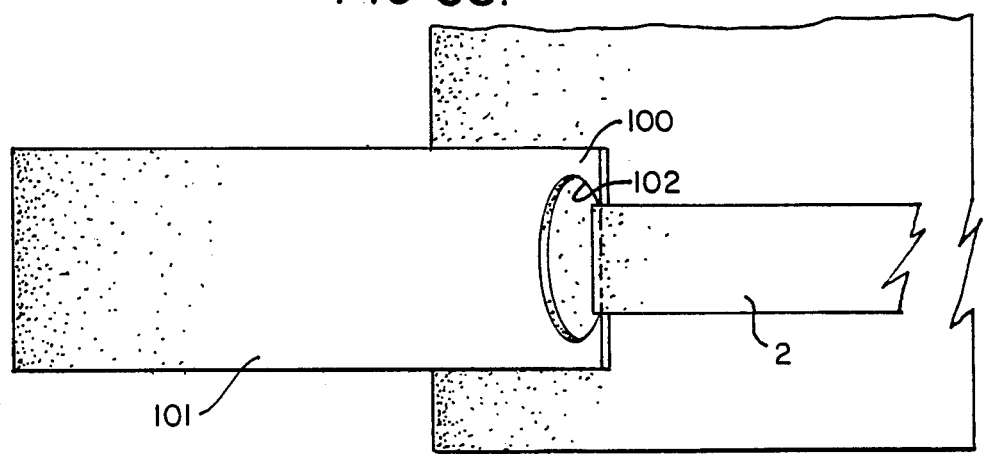
FIG. 39 is a side view thereof.

Another style of bracket for use in conjunction with this invention, is shown in FIGS. 37 through 39. As disclosed, the bracket is formed as a shaped support which is constructed having a pair of base members, as at 99 and 100, and which is integrally formed having a protruding portion, as at 101, shaped extending away from the pole, with the shape of this protruding portion, in this particular instance, being rather arcuate in configuration, although other shapes, as in the rectangular design, trapezoidal, truncated, or related designs, may likewise be designed into the configuration for this particular bracket. The base members 99 and 100, or at their juncture with the portion 101, each have an aperture, as at 102, formed therein, and through which the band means 2 may extend for mounting of this particular bracket tightly to the utility pole. And, in its installation, the band means 2, as can be seen, will firmly bind against the base members 99 and 100, so as to assure the fixation of this bracket upon the pole. Thus, it is further likely that the bracket may be fabricated from a more flexible type of metal, or the like, so that it may be shaped in place, at the site of its installation, to assure that its base members 99 and 100 are aligned for flush retention upon the surface of the pole, and in addition, to provide for a bending and reshaping of the protruding portion 101, if desired, to provide the type of support needed for retention of other instrumentalities, such as small electrical devices, or wires, upon the utility pole.

Variations or other modifications to the structure of this particular flexible banding means, and the instrument support system of this invention, in addition to the variety of connectors and brackets as disclosed, and their application, may occur to those skilled in the art upon reviewing the subject matter of this disclosure. Such variations or modifications, if within the spirit of this invention, are intended to be encompassed within the scope of any claims to patent protection issuing upon the same. The description of the preferred embodiment set forth herein, in addition to the drawings as shown, are provided primarily for illustrative purposes only.

Having thus described the invention what is claimed and desired to be secured by Letters Patent is:

1. A flexible banding and instrument support system for use in securing an instrument to a utility pole having a particular width, comprising, flexible banding means provided for substantially surrounding a pole and capable of conforming to its outer surface upon tightening of the system therearound, bracket means held by said flexible band to the pole, said bracket means capable of cooperating with fastening means providing a stable connection of an instrument to the pole, said flexible banding means having a pair of free ends, a pair of connectors cooperating with the band mean ends, and which when adjusted into a tightened position drawing the proximate band ends together for securement of the band, its held bracket means. and any instrument held thereby securely to the pole, said connectors comprising an extruded length of material and each having a base portion, and each having a series of slots therein, a pair of slots in each base portion of a connector and useful for accommodating the insertion of the flexible band end therein, and the other slot disposed for insertion of a bolt means therethrough and which when tightened providing for a contracted drawing of the band ends together for securement of the system to a pole, said bolt means inserting through a slot of each of the connectors and when tightened drawing the bands' ends together and tightening the held bracket means to the supporting pole, each band end as inserting through each pair of slots of a connector having its end also being turned back for disposition beneath their respective connector, and upon tightening of the bolt means the said band ends locate intermediate the connector and the contiguous pole for securely mounting of the bracket means to the said pole, one of said connectors comprising an angle, the other connector comprising a J-clamp, and each of said angle and J-clamp having the aligned slots arranged therethrough, said bolt means securing through the said slots, the J-clamp provided for securement of the bolt means head therein during bolt means tightening, said bracket means having a substantial length equivalent to the width of the pole to which it mounts, said bracket means including a base member disposed for being embraced by the flexible band when tightened upon a utility pole, said base member including a series of integral ribs formed upon the base member corresponding to the entire length of the said bracket mans, said ribs extending from the base member towards the supporting pole and provided for stabilizing the mounting of the bracket means upon the said pole, said bracket means having a pair of walls projecting integrally and outwardly from the base member oppositely from its extending ribs, said walls having inturned edges along their oppositely disposed edges, and forming a space therebetween, for accommodating and holding against turning the head of a fastener useful for securement of an instrument to the supporting pole.

* * * * *